United States Patent
Friedman

(10) Patent No.: US 6,405,843 B1
(45) Date of Patent: Jun. 18, 2002

(54) SELF SUPPORTING CABLE FOR USE WITH LINEAR MOTION DEVICES

(75) Inventor: Gerald M. Friedman, New Ipswich, NH (US)

(73) Assignee: PRI Automation, Inc., Billerica, MA (US)

( * ) Notice: Subject to any disclaimer, the term of this patent is extended or adjusted under 35 U.S.C. 154(b) by 0 days.

(21) Appl. No.: 09/574,127

(22) Filed: May 19, 2000

(51) Int. Cl.[7] .............................................. H02G 11/00
(52) U.S. Cl. ................................ 191/22 R; 174/177 F; 174/177 FE; 191/12.4
(58) Field of Search ........................ 174/69, 117 FF, 174/117 F; 191/12 R, 12.4

(56) References Cited

U.S. PATENT DOCUMENTS

| | | | | |
|---|---|---|---|---|
| 3,433,889 A | * | 3/1969 | De Vries | 174/69 |
| 4,197,154 A | * | 4/1980 | Pfaff, Jr. | 156/355 |
| 4,652,772 A | * | 3/1987 | Shephard | 307/147 |
| 4,987,442 A | * | 1/1991 | Uemori | 355/50 |
| 5,096,316 A | * | 3/1992 | Otsuka et al. | 400/692 |
| 5,300,899 A | * | 4/1994 | Suski | 333/1 |
| 5,428,187 A | * | 6/1995 | Crane et al. | 174/36 |
| 5,651,694 A | * | 7/1997 | Miyasaka et al. | 439/492 |
| 5,900,588 A | * | 5/1999 | Springer et al. | 174/117 F |

FOREIGN PATENT DOCUMENTS

| | | | | |
|---|---|---|---|---|
| JP | 5298937 A | * | 4/1992 | H01B/7/04 |
| JP | 05298937 A | * | 11/1993 | |

* cited by examiner

Primary Examiner—S. Joseph Morano
Assistant Examiner—Frantz F. Jules
(74) Attorney, Agent, or Firm—Weingarten, Schurgin, Gagnebin & Lebovici LLP

(57) ABSTRACT

A self supporting electrical cable is provided which is especially of use in linear motion devices. The cable is in the form of a band having a crowned or curved cross-section. The band is self supporting and is typically employed in a looped configuration. The band is composed of a Mylar or other plastic or electrically insulating laminate with electrical conductors and reinforcing elements. The conductors are typically copper and the reinforcing elements are typically stainless steel. In use the cable is usually folded back on itself 180° to provide a loop configuration with a fixed radius loop end in which the loop is moveable along the direction of travel. One end of the cable is connected to the linear motion device, and the other end is connected to a stationary device.

12 Claims, 3 Drawing Sheets

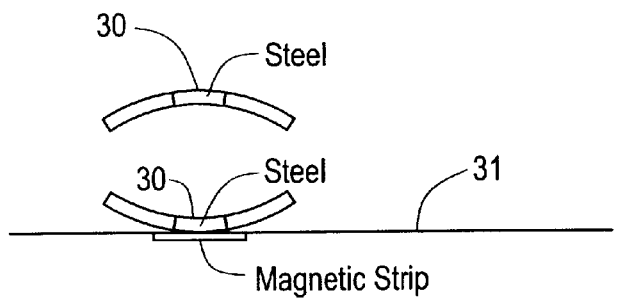
FIG. 5
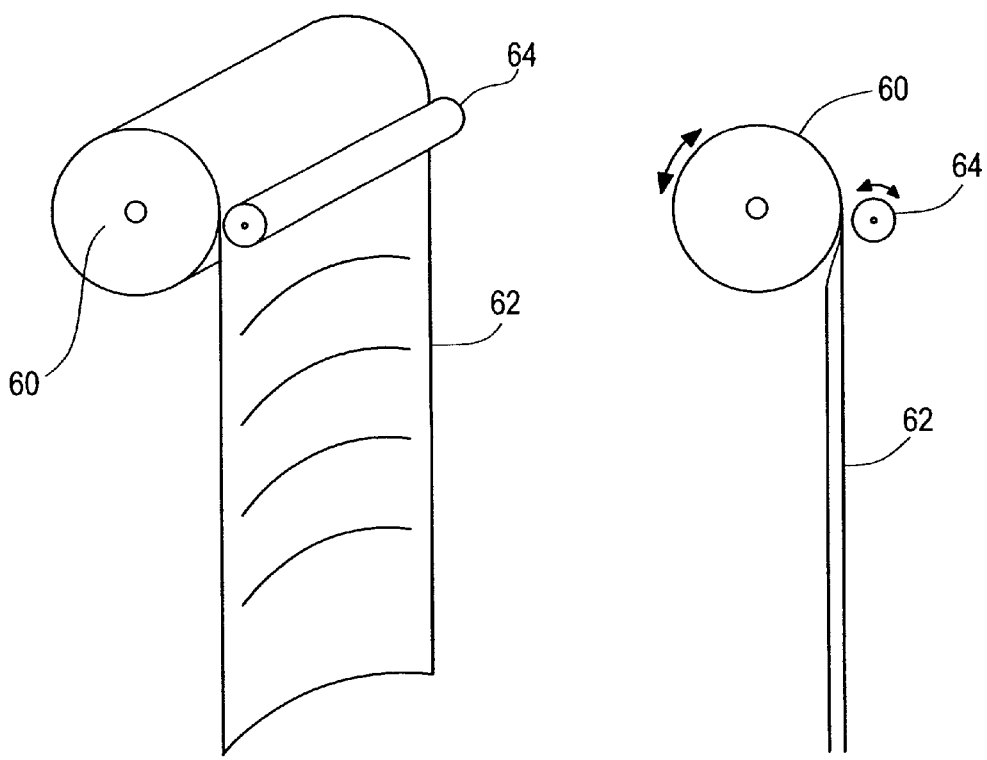
FIG. 6A  FIG. 6B

SELF SUPPORTING CABLE FOR USE WITH LINEAR MOTION DEVICES

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Linear motion devices are known in which a car, carriage or other device is moveable along a linear path. The motion may be along a vertical path as in a hoist or elevator, or along a horizontal path as in movement of cars along a rail such as in automatic transport equipment in a manufacturing facility. Also in copying and printing machines. Similar movement also occurs in copying and printing machines in which a print head or other mechanism is moveable along an intended path. Electrical signals transferred to or from a moving carriage from a stationary source employ interconnecting cables which are usually disposed within a defined area to not interfere with movement of the carriage and to prevent damage to the cable during carriage motion. The cables or electrical wires are often disposed in association with a multi-link chain which is moveable along the travel path of the carriage and which guide the electrical cabling. However, such chains can collect dirt and the links rubbing together can generate dirt and debris which affects the overall cleanliness of the environment in which the cable is employed. A clean environment is especially useful and often necessary for many manufacturing and other fabrication processes in which a moving carriage is utilized. A particular example is in semiconductor manufacturing in which cleanliness is imperative for fabricating satisfactory semiconductor wafers. Such multi-link chains are also unable to be self supporting over long lengths of travel and thus require supporting trays, platforms, or rollers along a travel path where without such support the chain and accompanying cable would sag or not remain in intended position.

BRIEF SUMMARY OF THE INVENTION

In accordance with the present invention, a self supporting electrical cable is provided which is especially of use with linear motion devices. The cable is in the form of a band having a crowned or curved cross-section. The band is self supporting and is typically employed in a looped configuration. The band is composed of a Mylar or other plastic or electrically insulating laminate with electrical conductors and reinforcing elements disposed therein. The conductors are typically copper and the reinforcing elements are typically stainless steel. In use the cable is usually folded back on itself 180° to provide a loop configuration with a fixed radius loop end in which the loop is moveable along the direction of travel. One end of the cable is connected to the linear motion device or other moving device, and the other end of the cable is connected to a fixed device or apparatus, which can include a source of electrical energy. The conductors of the flat cable can be shielded if desired to minimize electrical interference. The camber or crown of the cable stiffens the cable such that the cable is self supporting even when disposed horizontally along its length or at an inclined position. The cable or band does not have any elements which rub against each other as do the links of a conventional cable chain and thus the present invention provides a cleaner and also quieter cable structure.

Another embodiment of the invention employs a center area of the band which is of a magnetically permeable material. This center area can engage a magnetic strip or series of magnets located along a travel surface to retain the band in position, which is useful especially over relatively long travel distances.

BRIEF DESCRIPTION OF THE SEVERAL VIEWS OF THE DRAWING

The invention will be more fully understood from the following detailed description taken in conjunction with the drawings in which.

FIG. 5 is a cross-sectional view of the upper and lower portions of a looped cable in a second embodiment;

FIG. 6A is a pictorial view of the cable wound on a drum or reel; and

FIG. 6B a side view of the embodiment of FIG. 6A.

DETAILED DESCRIPTION OF THE INVENTION

Figure 1:
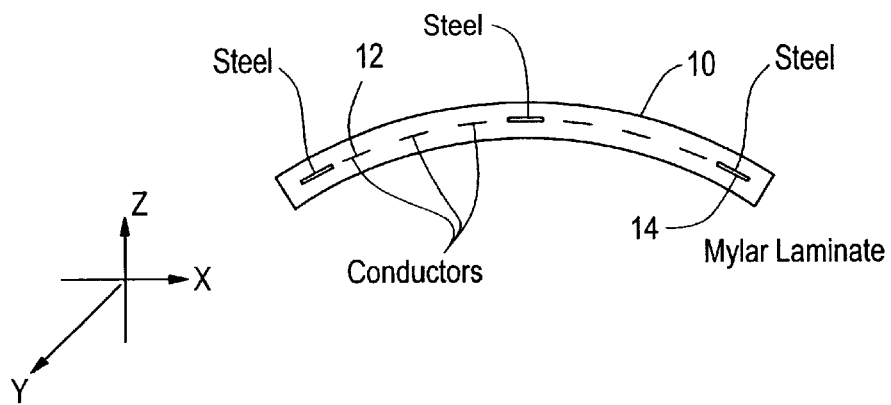
FIG. 1 is a cross-sectional view of a self supporting cable in accordance with the invention.

An exaggerated cross section of a cable constructed in accordance with the invention is shown in FIG. 1. A band 10 of electrically insulating material is formed with a crowned or curved cross-section as shown and is of a length to suit the particular installation requirements. A plurality of flat electrical conductors 12 are disposed within the band and extend longitudinally along the length of the band. The conductors are preferably of copper but can be of any other suitable electrically conductive material. A plurality of reinforcing strips 14 are provided in the band and extend along the length of the band to provide an intended mechanical strength for the cable. The reinforcing strips are preferably stainless steel. The band is typically formed of Mylar or other plastic material and the cable can be formed by extrusion of the plastic over and embedding the conductors and reinforcing elements. Alternatively, the cable can be formed by lamination techniques wherein the conductors and reinforcing strips are disposed and secured within bonded layers of insulating material.

The cable is connected at one end to a moveable device, and the other end of the cable is usually connected to a stationary device or apparatus. Electrical power is applied to the cable via the stationary apparatus and is fed over the cable conductors to the moveable device, usually for powering of the device for movement along its travel path.

Figure 2:
FIG. 2 is a cross-sectional view of the top and bottom portions of a looped cable in accordance with the invention.
Figure 3A:
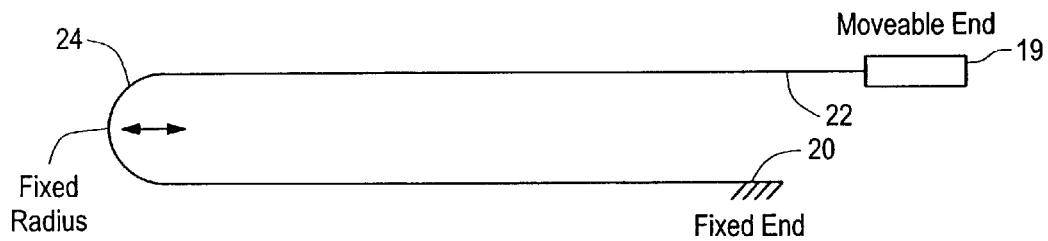
FIG. 3A is a diagrammatic side view of a looped cable having a lower fixed end.
Figure 3B:
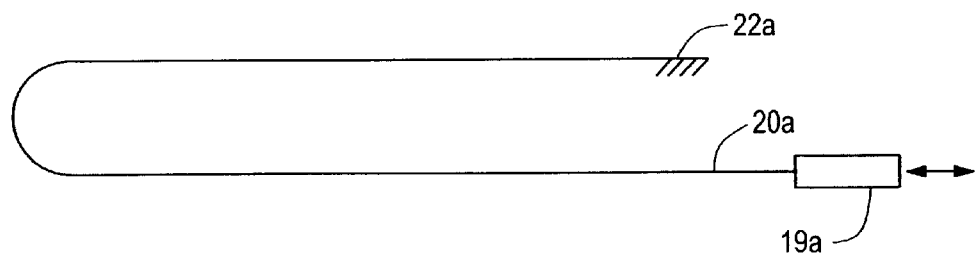
FIG. 3B is a diagrammatic side view of a looped cable having an upper fixed end.

The cable is often folded in a 180° loop in which one end of the cable is fixed and the other end is moveable, as shown in FIG. 3A. Referring to FIG. 3A a fixed end 20 is attached to a suitable support structure, and the moveable end 22 is attached to moveable apparatus 19 such as a linear motion device moving along a horizontal path in the illustrated version. A fixed radius loop 24 of the cable is moveable along a horizontal path as the moveable end of the cable moves forward or backward along the path. A cross-section of the moveable and fixed portions of the cable is shown in FIG. 2. Either the top end or bottom end of the cable can be fixed and the other end moveable. As shown in FIG. 3B the upper end 22a is fixed and the lower end 20a is moveable with moveable apparatus 19a.

Figure 3C:
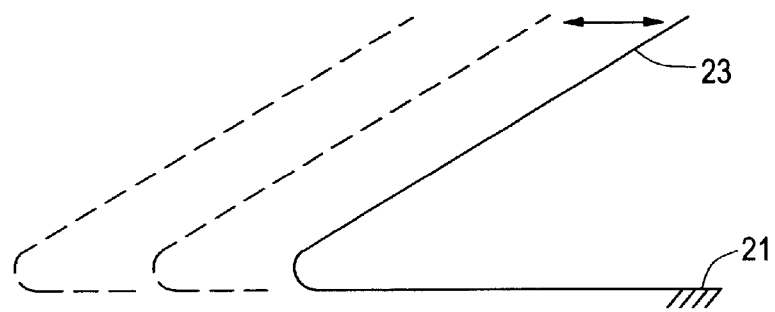
FIG. 3C is a diagrammatic side view of a cable having a non-horizontal looped end.

The cable need not be disposed along a horizontal path but may be disposable along angular paths as shown in FIG. 3C. In this arrangement the lower end 21 of the cable is fixed and the upper end 23 is moveable. The cable is disposed at an acute angle as illustrated and upon horizontal movement of the end 23, the cable retains its angular disposition as shown by the dotted lines.

Figure 4:
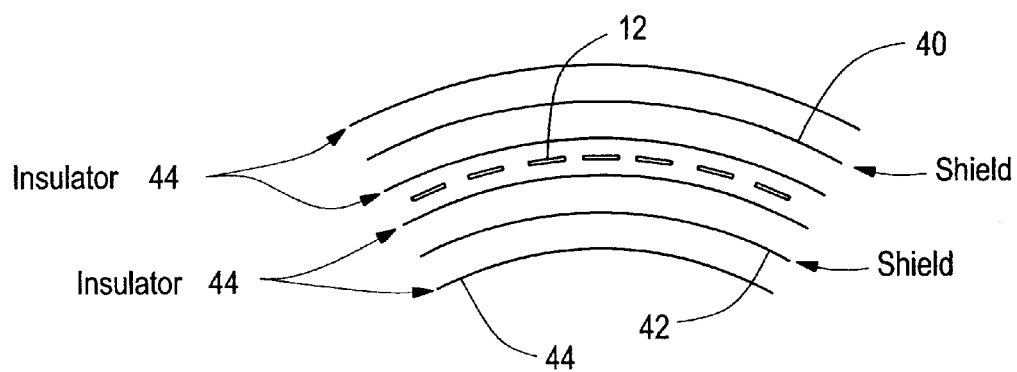
FIG. 4 is a cross-sectional view of a self supporting cable having electrical shielding.

The conductors of the flat cable can be shielded to minimize electrical interference. As shown in FIG. 4, shield layers are provided by metal foil 40 and 42 disposed between insulating layers 44. The conductors 12 are disposed in the center of the layered structure. Shielding can also be provided by use of metalized plastic film where the metalized surfaces are on the outside of the laminated cable structure. The metal foil in addition to providing electrical shielding can also serve as mechanical reinforcement for the cable.

An embodiment is shown in FIG. 5 in which a center portion 30 of the cable is of a magnetically permeable material, such as steel. This magnetically permeable material is disposed along a travel surface 31 which contains one or more magnets 32 to retain the band in position. This configuration is especially useful when the cable is deployed over relatively long travel distances to maintain the cable in position.

The cable may be wound on a drum or reel for some applications and pulled from the reel along an intended path. Referring to FIGS. 6A and 6B there is shown a drum 60 rotatable about a center shaft and having windable thereon the crowned flat cable 62. A retention roller 64 is located adjacent to the drum 60 and is biased toward the drum to guide and flatten the crowned cable as it is wound onto the drum. As the cable is unwound from the drum, the cable assumes its crowned cross-section after it leaves the retention roller.

Various modifications and alternative implementations may occur to those of skill in the art without departing from the spirit and true scope of the present invention. Accordingly, the invention is not to be limited by what has been particularly shown and described.

What is claimed is:

1. A self supporting electrical cable comprising:
   an elongated hand of electrically insulating material having a cross-section in a relaxed condition having a bowed shape defined by opposed surfaces curved to provide a convex surface and a concave surface, the curvature of the convex and the concave surfaces extending orthogonally to the longitudinal axis of the band across the width of the band;
   a plurality of electrical conductors disposed in the band and extending along the longitudinal axis thereof; and
   at least one reinforcing element disposed in the band and extending along the longitudinal axis thereof.

2. The cable of claim 1 wherein the band is formed of an electrically insulating plastic material.

3. The cable of claim 1 wherein the conductors are each a flat copper strip.

4. The cable of claim 1 wherein the at least one reinforcing element is a strip of high tensile strength material.

5. The cable of claim 4 wherein the at least one reinforcing element includes a plurality of reinforcing elements disposed in spaced relation across the width of the band and each extending along the longitudinal axis of the band.

6. The cable of claim 1 wherein the elongated band of electrically insulating material is of laminated construction composed of at least two insulating layers together to contain the plurality of electrical conductors.

7. The cable of claim 1 including electrical shielding for the electrical conductors.

8. The cable of claim 7 wherein the electrical shielding is provided by electrically conductive layers disposed on each side of the electrical conductors.

9. A self supporting electrical cable comprising:
   an elongated band of electrically insulating material having a cross-section which is curved orthogonally to the longitudinal axis of the band;
   a plurality of electrical conductors disposed in the band and extending along the longitudinal axis thereof; and
   at least one reinforcing element disposed in the band and extending along the longitudinal axis thereof; and
   a center portion of a magnetically permeable material;
   and wherein the cable is disposable along a travel surface which contains one or more magnets to retain the band in position.

10. A self supporting electrical cable comprising:
    an elongated band of electrically insulating material having a cross-section in a relaxed condition having a bowed shaped defined by opposed surfaces curved to provide a convex surface and a concave surface, the curvature of the convex and the concave surfaces extending orthogonally to the longitudinal axis of the band across the width of the band;
    a plurality of electrical conductors disposed in the band and extending along the longitudinal axis thereof;
    a first electrically shielding layer disposed on one side of the band and a second electrical shielding layer disposed on the opposite side of the band; and
    the band having strength sufficient to be self supporting along a predetermined length.

11. The cable of claim 10 wherein the curve of the band stiffens the band to provide self support along an intended length.

12. A linear motion assembly comprising:
    a linear motion device moveable along a path; and
    an electrical interconnection between the linear motion device and a fixed device, the electrical connection comprising:
    a self-supporting electrical cable having one end connected and moveable with the linear motion device, and having the other end connected to the fixed device;
    an elongated band of electrically insulating material having a cross-section in a relaxed condition having a bowed shaped defined by opposed surfaces curved to provide a convex surface and a concave surface, the curvature of the convex and the concave surfaces extending orthogonally to the longitudinal axis of the band across the width of the band;
    a plurality of electrical conductors disposed in the band and extending along the longitudinal axis thereof; and
    at least one reinforcing element disposed in the band and extending along the longitudinal axis thereof.

* * * * *

UNITED STATES PATENT AND TRADEMARK OFFICE
CERTIFICATE OF CORRECTION

PATENT NO. : 6,405,843 B1
DATED : June 18, 2002
INVENTOR(S) : Gerald M. Friedman It is certified that error appears in the above-identified patent and that said Letters Patent is hereby corrected as shown below:

Column 4,
Line 12, "orthogonally to the" should read -- about the --; and
Line 15, "thereof; and" should read -- thereof; --.

Signed and Sealed this

Twenty-third Day of March, 2004

JON W. DUDAS
*Acting Director of the United States Patent and Trademark Office*